United States Patent [19]

Chambers et al.

[11] Patent Number: 4,935,904
[45] Date of Patent: Jun. 19, 1990

[54] METHOD FOR SUPPRESSING COHERENT NOISE IN SEISMIC DATA

[75] Inventors: Ronald E. Chambers, Houston; Alfonso Gonzalez, Sugar Land, both of Tex.

[73] Assignee: Western Atlas International, Inc., Houston, Tex.

[21] Appl. No.: 363,622

[22] Filed: Jun. 8, 1989

[51] Int. Cl.$^5$ .............................................. G01V 1/36
[52] U.S. Cl. ...................................... 367/38; 367/53; 364/421
[58] Field of Search ...................... 367/50, 53, 73, 38; 364/421

[56] References Cited

U.S. PATENT DOCUMENTS

| | | | |
|---|---|---|---|
| 4,437,176 | 3/1984 | Mack | 367/38 |
| 4,468,761 | 8/1984 | Rietsch | 367/43 |
| 4,479,183 | 10/1984 | Eraas | 364/421 |
| 4,499,598 | 4/1988 | Chittineni | 382/54 |
| 4,581,715 | 4/1986 | Hyatt | 364/726 |
| 4,648,120 | 3/1987 | Chittineni | 382/54 |
| 4,677,597 | 6/1987 | Wright | 367/47 |
| 4,694,438 | 7/1987 | Sengupta | 367/70 |
| 4,750,156 | 6/1988 | Abrams et al. | 367/42 |
| 4,797,861 | 1/1989 | Beasley | 367/50 |
| 4,809,238 | 2/1989 | Bishop et al. | 367/46 |
| 4,829,487 | 5/1989 | Malloy | 367/40 |

OTHER PUBLICATIONS

Kjartansson, Einar, 1979; Attenuation of Seismic Waves in Rocks and Applications in Energy Exploration; Stanford Univ. Ph.D. Dissertation.
Yilmaz, O., "Migration" in Seismic Data Processing, Society of Explor. Geophy., pp. 241–276.
"Absorbing Boundary Conditions for Wave Equation Migration," Clayton, R. W. et al., Geophysics, vol. 45, #3, pp. 895–904 May, 1980.

Primary Examiner—Ian J. Lobo
Attorney, Agent, or Firm—Barry C. Kane

[57] ABSTRACT

A method for removing boundary-generated artifacts in synthetic and actual seismic data. After seismic data processing, undesirable boundary-generated artifacts appear in the final seismic section. To remove this unwanted noise from the section, zeros are added to the lower boundary of the seismic section. This essentially pushes the sources of the noise downward in time in the section. After padding with zeros, the seismic data is collapsed to their point sources of origin using the Stolt migration/diffraction algorithm. Once the data are collapsed, the size of the seismic section is reduced to its original size. Following the resizing of the section, the inverse of the earlier applied Stolt algorithm is applied to return the seismic data to its original form, minus the boundary-generated artifacts.

8 Claims, 5 Drawing Sheets

METHOD FOR SUPPRESSING COHERENT NOISE IN SEISMIC DATA

BACKGROUND OF THE INVENTION

1. Field of the Invention

This invention relates to seismic data processing and particularly to a method for identifying and removing boundary-generated noise artifacts manifested in both actual and synthetic seismic data.

2. Description of the Related Art

Seismic data generally consist of a plurality of traces plotted as a function of time or depth versus location along the surface of the earth. The data may be from a field location, or it may consist of synthetic data derived from a geologic model. Each trace displays the subsurface response to an acoustic signal. These responses aid the geologist and geophysicist to interpret the structures present in the subsurface. To obtain a meaningful and accurate display, the data are often reprocessed. The data are manipulated in a data processing center using both manual and digital computer techniques to provide the best section. Such manipulations typically involve moving adjacent traces up or down to correct for topographic or near surface irregularities, normal move-out (NMO), and stacking.

Once the data are corrected for statics, normal moveout and stacking, the data are often filtered. Band-pass filtering is a process for eliminating the frequencies that are not seismically useful; typically frequencies above or below those transmitted by the subsurface layers. When the seismic energy is transmitted through the earth, distortions may be induced which may be removed by a filtering process called convolution.

Lastly, it is a generally known that the subsurface layers are not always horizontal, but may dip or be folded. Seismic energy reflected from such dipping or folded layers also introduce errors in the data. Seismic data displayed in a seismogram are displayed vertically, which incorrectly displays the location of reflections from dipping or folded subsurface layers. To correctly position these reflections, the paths of the seismic signals must be changed during the processing step. Migration is the process employed to make these corrections. If the subsurface layers dip more than about 10 degrees, un-migrated sections can be misleading. For example, anticlines may appear much larger than in fact. Several types of migration are available to the operator to make the corrections for processing purposes, each type changing the domain in which the data were originally collected.

After data processing, including the static, dynamic and residual corrections, band-pass filtering, deconvolution and migration, the seismogram generally is ready for interpretation. However, the seismogram is not in its best possible form. Certain noise artifacts are difficult to remove using the above processing techniques. One type of artifact is generated during migration processing and is known as boundary-generated noise. Boundary-generated noise consists of diffraction hyperbola or semicircles appearing at the boundaries of the seismic grid defining the seismogram. The data processing algorithms used to originally process the raw data may assume that the data is periodic: in essence the section is repeated as a function of time. The algorithms in the data processing routine recognize the artificial boundaries as point sources of energy and try to manipulate them as it would the rest of the seismic data. The end result are noise artifacts such a semicircles or tails of semicircles appearing in the final section.

In the past, boundary-generated noise was removed by adding zeros to the end of the data prior to the processing stage. This process is termed "padding" or "zero padding." A major problem associated with zero padding during the initial processing stage is the increased computer time necessary to process the data. Computer (CPU) time is generally expensive and is a leading contributor to seismic exploration costs. For the sake of example, assume the cost to process data without zero padding and leaving the boundary-generated noise in the section can be equated to one. The cost to conventionally process the same seismic data padded with zeros for removing the boundary-generated noise may be four times greater.

There has been a long felt and yet unsolved need for a method to remove this type of artifacts from the seismogram while simultaneously reducing data processing costs over the conventional technique.

SUMMARY OF THE INVENTION

It is an object of this invention to provide a method for removing artifacts in seismic data generated by artificial periodic grid boundaries.

It is another object of this invention to provide a low cost, yet efficient method for removing boundary-generated noise artifacts from seismic data, both actual and synthetic.

In accordance with the objects of this invention, this method identifies and removes artifacts generated by artificially defined grid boundaries from the seismic data after the data have been substantially processed. In general, this is accomplished by adding zeros to the lower boundary of the seismic data ("zero padding") to increase the size of the seismic data grid, and collapsing the noise artifacts to a point of origin using a migration/diffraction algorithm. After collapsing (diffracting) the noise to a point source, the lower boundary of the seismic data is reduced or "zeroed" to remove the noise. After zeroing, the data are reprocessed using the inverse of the earlier-applied migration algorithm, relocating the seismic data to their former positions. The energy points responsible for generating the artifacts have been removed from the seismic section by the zero padding. When the data are reprocessed, the hyperbolic tails or artifacts do not reappear in the seismic section. This inventive method is effective for a wide variety of seismic data modeling and migration algorithms including those involving frequency wave number and frequency-space domains.

There has been a longstanding and yet unsolved need for a method of removing such artifacts from seismic data. The resulting seismic data is less cluttered by extraneous signals leading to an improved section for the geophysicist to interpret.

BRIEF DESCRIPTION OF THE DRAWING FIGURES

The advantages and benefits of the instant invention may be better understood by reference to the appended drawing figures, wherein.

DETAILED DESCRIPTION OF A PREFERRED EMBODIMENT

Figure 1:
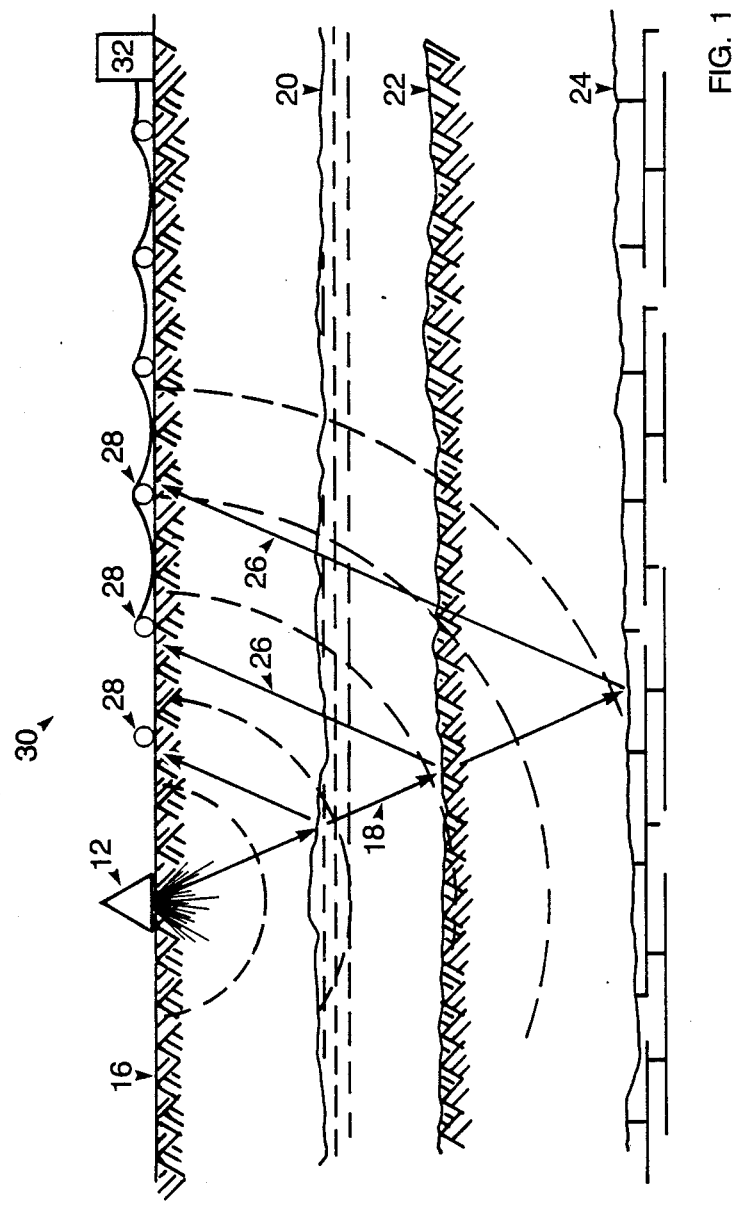
FIG. 1 is a general illustration of a seismic survey.

FIG. 1 is a general cross-section of the earth illustrating the basic concepts of a seismic survey. It should be understood that the following technique is described with respect to a land survey and can be applied equally as well to a marine seismic survey. In general, a seismic source 12 may be located at a desired point 14 above or along the surface of the earth 16. Actuation of the seismic source 12 imparts an acoustic signal 18 in the subsurface which radiates downward, impacting upon and passing through the various layers such as 20, 22 and 24 comprising the lithosphere. A portion 26 of the downward moving signal 18 is reflected back towards the surface of the earth by the acoustic impedance changes between adjacent subsurface layers. The reflected signals 26 arrive at the surface and are detected by a plurality of sensors 28 disposed along a line or in a grid 30. The received signals are converted by the sensors to electrical or optical signals and transmitted to a remote recording unit 32. These electrical or optical signals are recorded as a function of two-way travel time from the instant the acoustic source 12 is actuated.

Once the seismic signals have been recorded, the recording media may be sent to a data processing center where the data are processed to produce a seismogram or model of the subsurface. The data are generally corrected for statics and normal move-out (NMO) and may be stacked to remove noise between the traces. In addition the data may be migrated according to several different available methods to correct the data for dipping and folded beds. An example of such a section 34 shown in FIG. 5 which will be discussed in greater detail below.

The method of this invention basically comprises three steps. First is processing the data, correcting for statics, normal move-out, stacking and migrating the seismic data. Substantially no zero padding is used during the initial processing stage. This first step avoids the high computer costs associated with processing a large data set, at least half of which would have been zeros under the existing techniques. The second step in the method is to subtract the boundary-generated noise from the section. The second step is accomplished using a variation of Stolt's migration algorithm (See Appendix A). The third and last step is to display the data without the boundary-generated noise. The third step consists of the data after subtraction. That is without the boundary-generated noise in the section. The Stolt technique is highly efficient and accurate, making it attractive for the subtraction process.

As briefly mentioned above, the first step of the method is to process the data using substantially no zero padding. The raw seismic data is corrected for statics to correct for deviations in the surface elevations along the detection grid. Normal move-out (NMO) corrections are also performed and the data is stacked to average the signal amplitudes along each trace in a common midpoint (CMP) gather. Common midpoint stacking is typically the method used today. Once the data have been corrected and stacked, it may be migrated to correct for signals from dipping or folded reflectors. During the migration process, the data may be transformed from one domain to another. Alternatively, the data may be migrated prior to stacking. In that event, the data are automatically stacked during the migration process.

For the purposes of this discussion and by way of example only, assume transformation is from the time-space domain to the frequency-space domain, although frequency-wave number or other domain could be used. This initial stage of the method should be accomplished with substantially no zero padding. However if zero padding is elected during this stage of the method, up to as much as ten percent padding can be used without substantially increasing computer costs. Herein lies an important feature of this invention. As stressed earlier, the prior technique removed the noise by padding the data with zeros to move the diffraction hyperbola below the display area of the section. The amount of zero padding used may have been equal to the length of the raw seismic data, and often times more than twice as many zeros are added to the section than its original length. This resulted in high data-processing costs since there was a large data set to transform from one domain to the other domain. The cost associated with this invention over the conventional method discussed above is on the order of four times less.

In the instant method, relatively no padding is used in the initial processing step. The phrase "relatively no padding" as used herein may include padding with up to 10 percent of the data with zeros. Padding with 10 percent or less zeros does not produce a large increase in the computer time necessary to transform the data.

Figure 2:
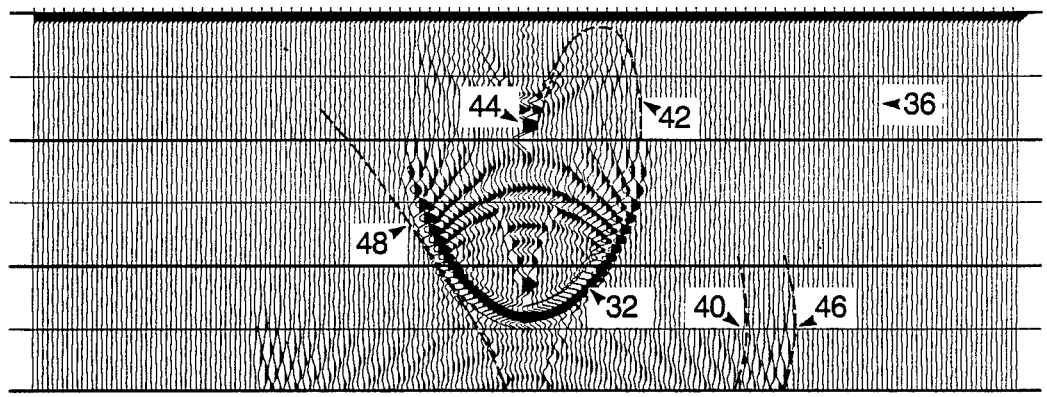
FIG. 2 is synthetic seismic data containing wrap-around noise artifacts caused by the a lower grid boundary of the section.

Refer to FIG. 2 which illustrates a synthetic seismic section 36 consisting of a single pulse 38 sampled at 4 millisecond intervals. The pulse 38 has been filtered, limited to a range between 4 and 20 hertz. The section 36 has also been migrated transforming the data from the time-space domain into the frequency-space domain using a finite difference migration algorithm. As would be expected, the migrated pulse forms a semicircle with its lower apex at approximately 1.25 seconds. Note the appearance of the semicircular diffractions along the lower boundary of the section generally indicated as 40. Upon closer examination, the migration algorithm used in the initial processing step produced a "heart-shaped" pattern 42 which approximates a cardioid or Archimedes Spiral curve. The distinct diffractions patterns 40 appearing towards the bottom of the section form a portion of this "heart-shaped" pattern. The upper limbs of the "heart" converge to create a pulse of energy 44 which is consistent with the finite difference algorithm. A second and a third artifact 46 and 48 respectively also appear in the section 36. This is due to a wrap-around effect closely related to the boundary-generated noise. The second artifact 46 caused by the algorithm appears at approximately 1.10 seconds, originating from a repeat of the energy pulse 36 occurring at approximately 2.5 seconds, below the section. The beginnings of the third convergence can be seen at the lower boundary of the section and indicated by lines 48. All of these artifacts are related to the boundary-generated noise inherent in conventional data processing techniques. No padding has been added to this section. It will be assumed for the purposes of this description that the pulse has been statically corrected as well as filtered and stacked up to this point in the method. Such corrections are generally not necessary when working with synthetic data.

Once the initial processing has been completed and the data have been migrated into the desired domain, the bottom of the seismic section 36 is padded with zeros to increase the size of the seismic data grid along the time axis. The amount of padding necessary to remove the boundary-generated noise may be as great as the two-way travel time. A Stolt algorithm is applied to the padded data to collapse the boundary-generated artifacts to their point of origin.

Figure 3:
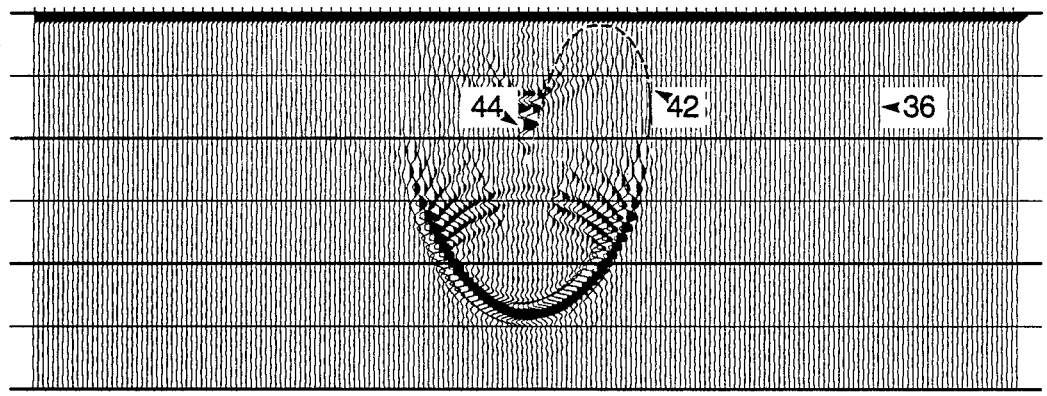
FIG. 3 is an example of the same seismic data shown in FIG. 2 with the artifacts removed by this invention.

Once the artifacts have been collapsed to their point of origin, the grid size is reduced to its original size before the addition of the zeros. This step effectively removes the source of the boundary-generated artifacts from the seismic grid. After the size of the seismic grid has been restored, the inverse of the Stolt algorithm (see Appendix A) used to collapse the artifacts is applied to the data. A much cleaner seismic section results without the semicircular "smiles" at the lower boundary. FIG. 3 is an example of the same section shown in FIG. 2 with the artifacts removed by this method. Note the absence of the diffraction semicircles at the bottom of the section. Note also the absence of the energy caused by the convergence associated with the finite difference migration applied earlier; i.e. the wrap-around artifacts. The slight upward trends towards the bottom of the section are most likely caused by multiple reflections of the upper horizons.

Figure 4:
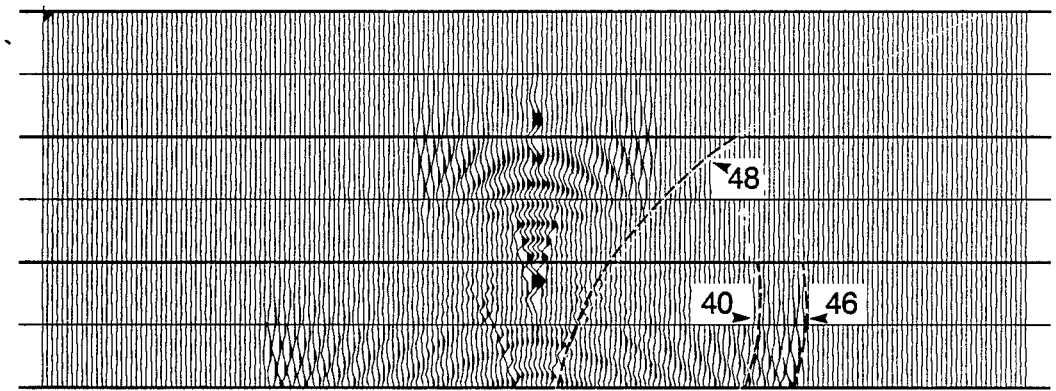
FIG. 4 illustrates the noise removed from the seismic section shown in FIG. 3.

FIG. 4 provides an illustration of the amount of noise removed from the seismic section shown in FIG. 3. This Figure was obtained by subtracting the data in FIG. 3 from the data shown in FIG. 2.

Figure 5:
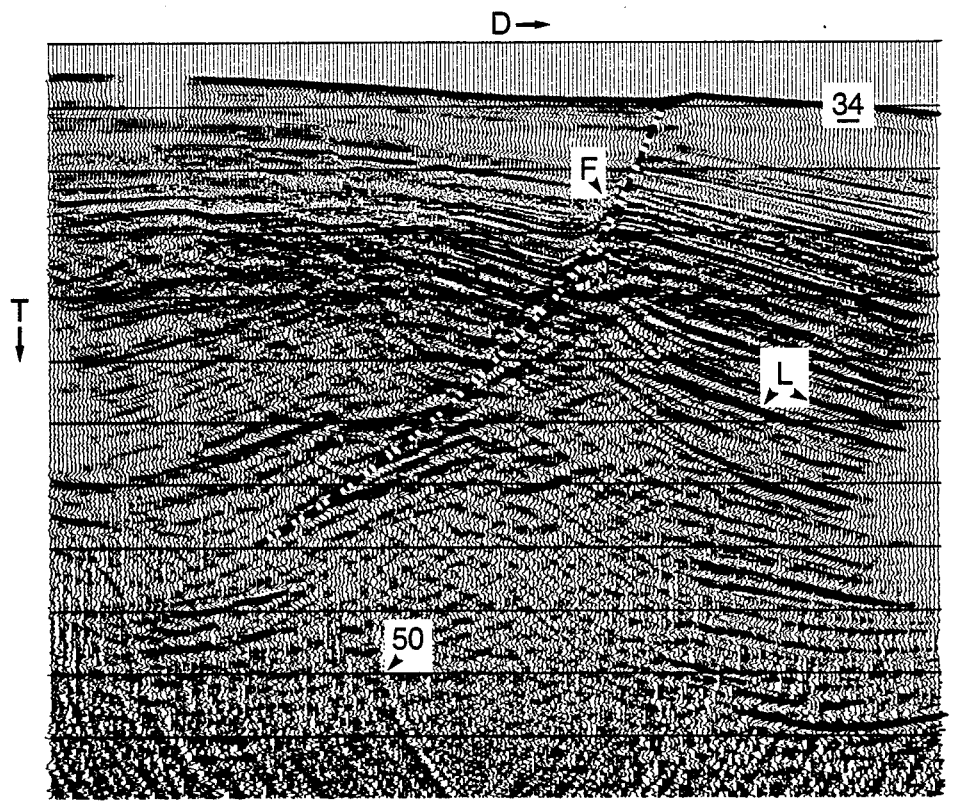
FIGS. 5 and 6 illustrate the method of this invention as applied to an actual seismic section containing the boundary-generated noise.
Figure 6:
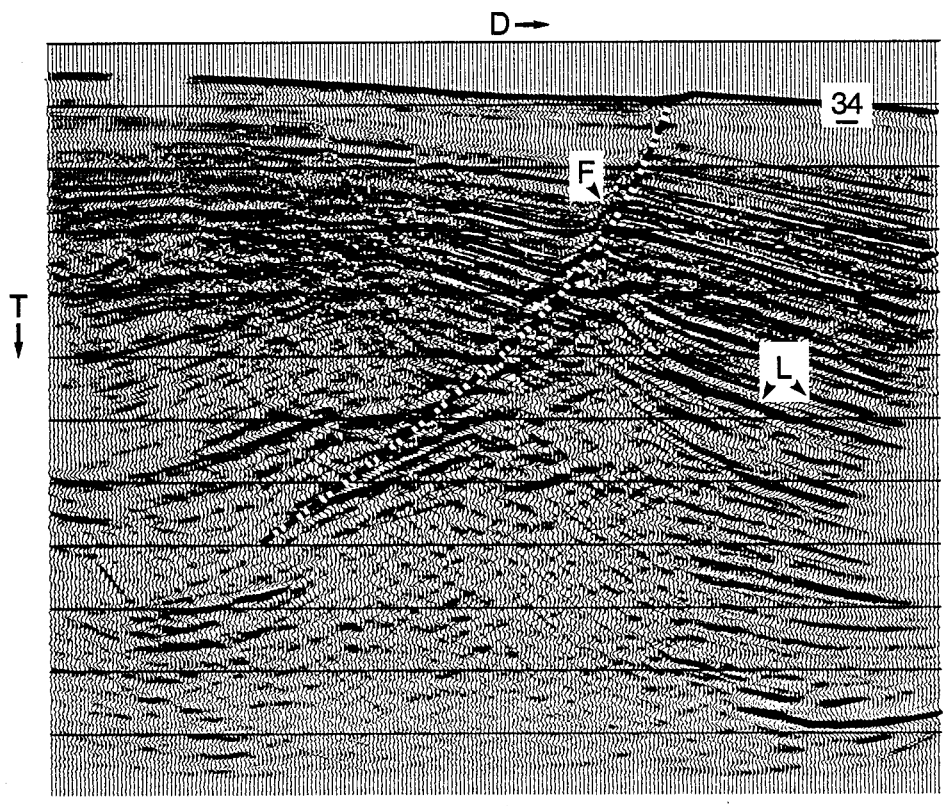

FIGS. 5 and 6 provide an illustration of the above method as performed on actual seismic data. The data in section 34 are displayed as a function of two-way travel time versus surface location. Two-way travel time is displayed along the vertical axis marked "T" while the surface location (or geophone number) of the sensors are displayed along the horizontal axis marked "D". The data display subsurface layers dipping to the left of the section with a probable fault plane "F" through the middle of the section and dipping to the right. The dark alignments "L" represent the boundaries between the subsurface layers or formations. Note near the bottom of the section the discordant upward curving diffraction patterns indicated as 50. These patterns, often called "smiles" or diffraction semicircles, do not represent subsurface layers and are caused by the artificial boundary at the bottom of the seismic section recognized by the processing algorithm.

FIG. 6 illustrates the same seismic section having the boundary-generated artifacts removed using the above method. Note again the absence of the semicircular patterns in the lower half of the seismic section.

Figure 7:
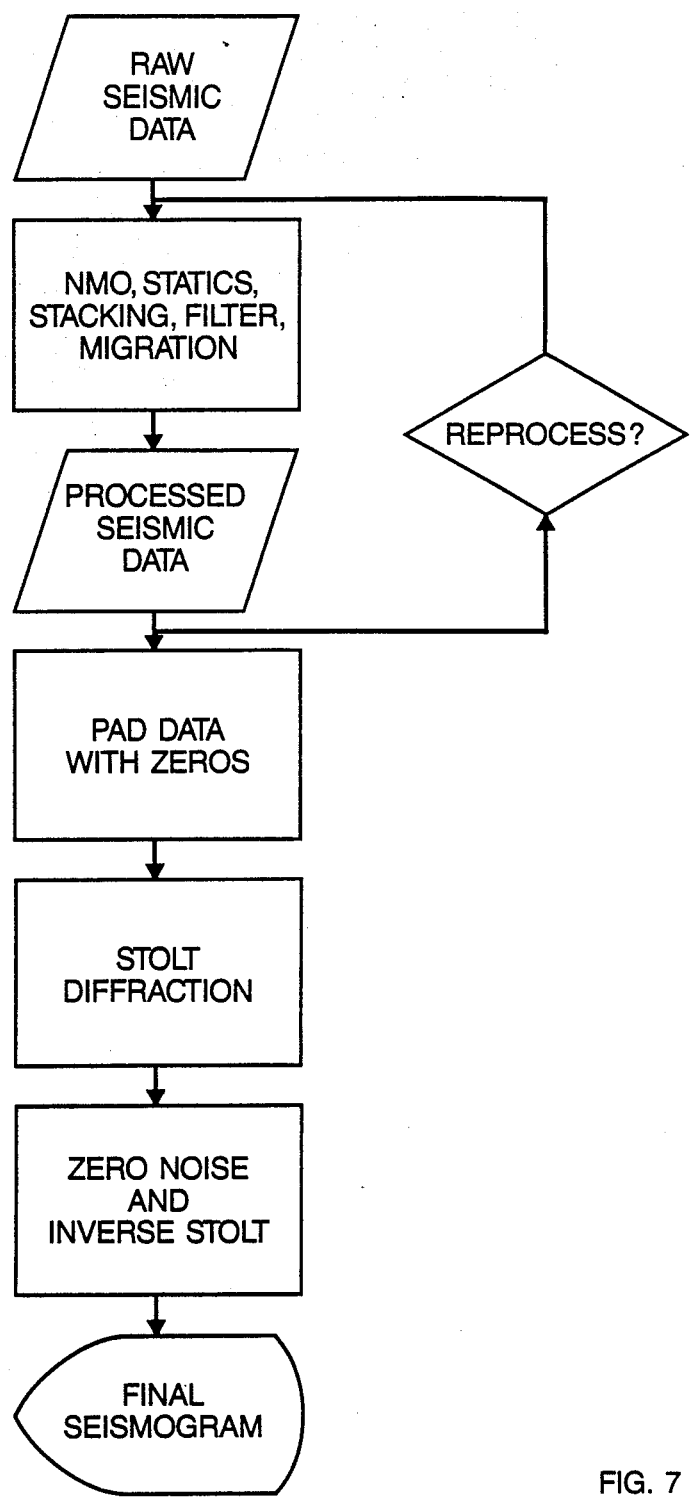
FIG. 7 is a flow chart illustrating the steps of this invention.

FIG. 7 is a flow chart illustrating the steps of this invention. In operation, raw seismic data is collected in the field and transported to a data processing center. There, the data are corrected for normal-move out, statics, filtered and migrated to obtain a heretofore final seismic section. This "final section" is padded with a sufficient amount of zeros to move the wrap-around or repetitive artifacts downward to its point sources by a Stolt algorithm. The amount of padding may vary, but the amount should be such that when the section is reduced and the algorithm reversed, the artifacts do not reappear in the section. After padding and application of the reverse of the Stolt algorithm, a final section is obtained without the artifacts generated by the artificial boundary.

In another embodiment of this invention, the method may be applied equally as well to modeling synthetic seismic data. In modeling synthetic seismic data, a geologic model is constructed by assigning reflection coefficients to interfaces between contrasts in seismic impedance. The result is called the "reflectivity model." The reflectivity model is the input to a wave equation based upon a numerical modeling process that simulates seismic waves propagating through the earth.

Numerical modeling of seismic data generates boundary-generated noise artifacts similar to those in actual data because of the assumption of periodic boundary conditions. This noise can be removed by reversing the method proposed above and outlined further in Appendix A. That is a reflectivity model is first generated and synthetic seismic data is simulated using a numerical propagation of waves through the earth. The resulting synthetic seismic data is then padded with zeros to extend the size of the seismic grid. Following this step, the data is migrated using the Stolt migration process. The migration step essentially collapses the diffraction semicircles to their point sources of origin well below the zone of valid data. After migration (or collapse), the size of the seismic grid is reduced to its original size, removing or "zeroing" the data below the zone of valid seismic data. After the seismic grid has been restored to its original size, an inverse of the Stolt migration process is applied to place the synthetic data in its original form.

Figure 8:
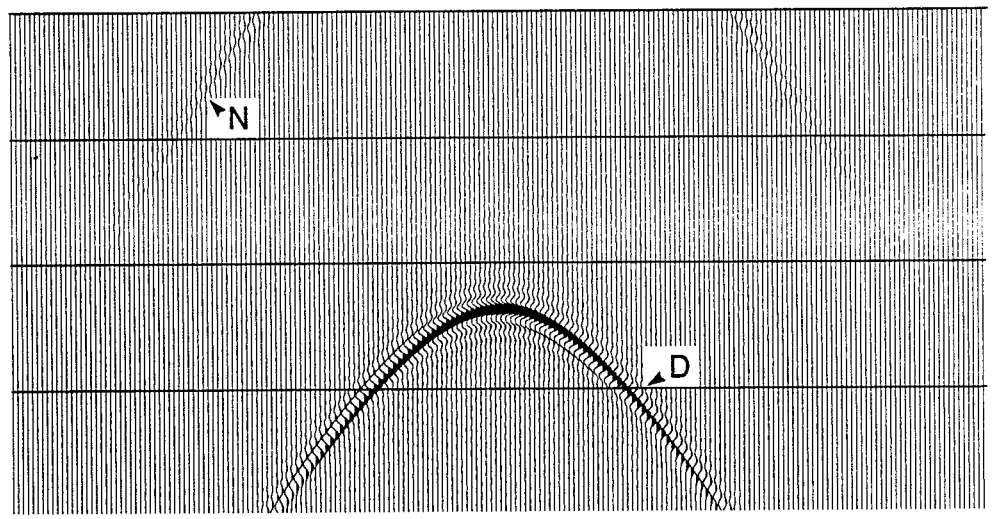
FIG. 8 illustrates synthetic data generated by a numerical simulation of wave propagation.
Figure 9:
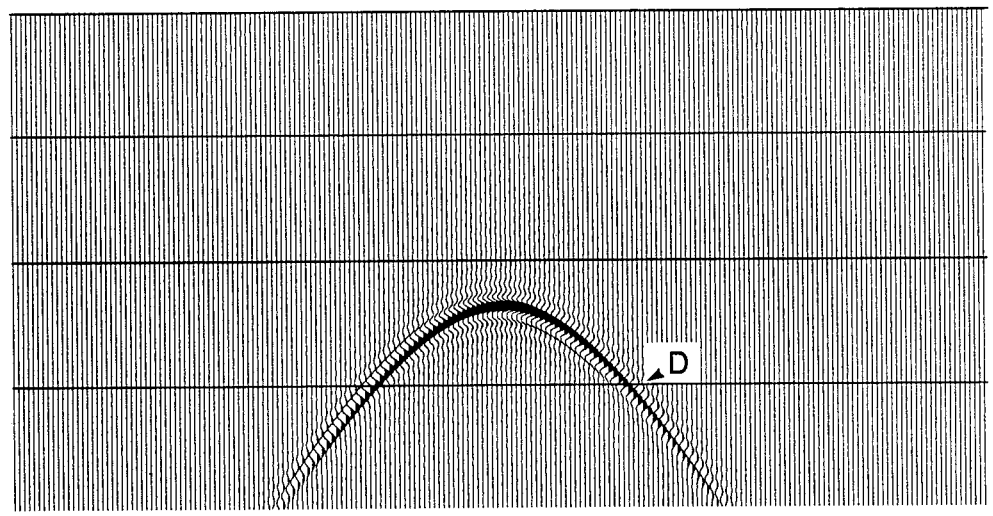
FIG. 9 illustrates the synthetic data in FIG. 8 with the noise removed using the inventive method.
Figure 10:
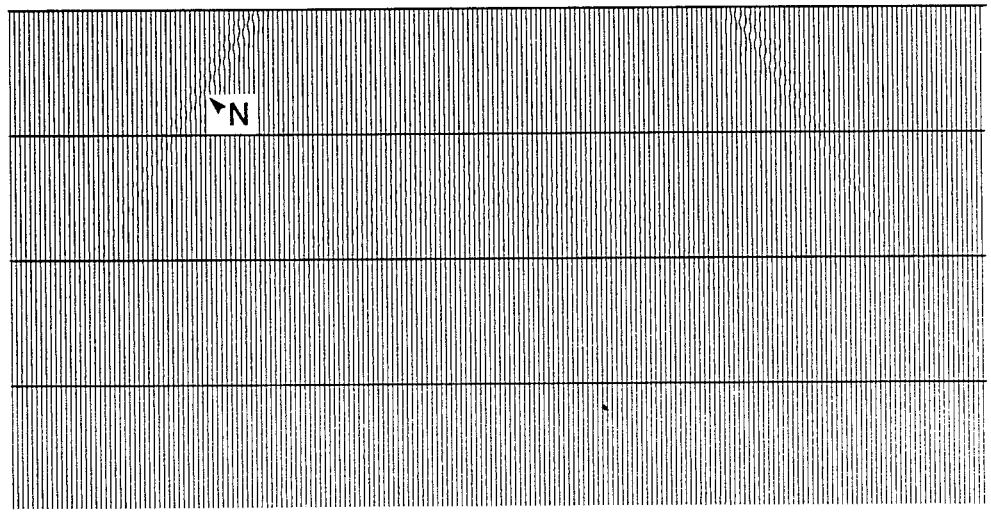
FIG. 10 illustrates the amount of noise removed from FIG. 8 using this method.

The steps may be better illustrated by referring to FIGS. 8 through 10. FIG. 8 represents synthetic seismic data generated by a numerical simulation of wave propagation in the earth. Note that the limbs "N" of the hyperbola or semicircle contaminating the valid data marked "D" in the section. The trends of the noise are highlighted by dash marks. The reflectivity model in this example is a point scatterer well known to those skilled in the art. FIG. 9 represents the same synthetic seismic data as shown in FIG. 8 with the contaminating noise removed using the aforementioned method. Note the absence of the hyperbola or semicircle tails pointed out in the previous figure. FIG. 10 illustrates the amount of noise removed from FIG. 9. This result is obtained by subtracting the data in FIG. 9 from the data in FIG. 8.

There has been a longstanding and yet unsolved need for a method of removing such artifacts from seismic data. The resulting seismic data is less cluttered with extraneous signals leading to an improved section for the geophysicist to interpret.

Our invention has been described with some degree of specificity. Variations will occur to those skilled in the art which are within the scope of this invention which is limited only by the appended claims.

APPENDIX A

Stolt Migration / Modeling

Migration

Given seismic data collected at the surface of the earth, p(x, y, z=0; t), where (x, y, z) are the coordinates of a point in the earth and t is time, the underground image can be obtained by the expression:

$$p(x,y,z; t=0) = \int\int\int dk_x dk_y d\omega P(k_x,k_y,z=0;\omega)e^{i(k_z z + k_x x + k_y y)} \quad (1)$$

where $P(k_x, k_y, z=0; \omega)$ is the three dimensional (3D) Fourier transform of the data, $(k_x, k_y, k_z)$ are the spatial wave numbers associated with the spatial (x, y, z) coordinates, and $\omega$ is the frequency.

$k_z$ is given by the dispersion relation of the 3D wave equation:

$$k_z = 2\omega/V \sqrt{1 - [(V^2/4^2)(k_x^2 + k_y^2)]} \quad (2)$$

Changing the variable $k_z$ in Equation (1) to $\omega$, we obtain $$p(x, y, z; t = 0) = \quad (3)$$

$$\int\int\int dk_x dk_y dk_z P[k_x, k_y, z = 0; \omega = \omega(k_x, k_y, k_z)] \cdot |d\omega/dk_z| \, e^{i(k_x x + k_y y + k_z z)}$$

where $$\omega = (V/2)\sqrt{k_x^2 + k_y^2 + k_z^2} \quad (4)$$

and $$|d\omega/dk_z| = [V \cdot |k_z|]/[2\sqrt{(k_x^2 + k_y^2 + k_z^2)}]. \quad (5)$$

Equation (3) has the form of a 3D inverse Fourier transform and is known as the Stolt Migration Equation.

Modeling

Synthetic seismic data can be obtained from a geologic model according the following expression:

$$p(x,y,z=0;t) = \int\int\int dk_x dk_y dk_z P(k_x,k_y,k_z;t=0)e^{i(k_x x + k_y y - \omega t)} \quad (6)$$

Using Equation (4), the variable $\omega$ can be changed to $k_z$ to obtain $$P(x,y,z=0;t) = \int\int\int dk_x dk_y dk_\omega P[k_x,k_y,k_z=k_z(k_x,k_y,\omega)] \cdot |dk_z/d_\omega| e^{i(k_x x + k_y y - \omega)} \quad (7)$$

where $k_z$ is given by Equation (2) and $$|dk_z/d\omega| = 1/[2V\sqrt{(1 - (V^2/4\omega^2)(k_x^2 + k_y^2)}] \quad (8)$$

Equation (7) has the form of a 3D inverse Fourier transform and is known as the Stolt Modeling Equation.

We claim as our invention:

1. A method for removing artifacts from data in a seismic section, comprising the steps of padding the data with zeros at a lower boundary thereof, collapsing the data to their point sources of energy, reducing the size of the seismic section to its original size before padding with zeros, and reversing the step of collapsing to restore the data to its original form.

2. The method of claim 1, further comprising the step of previously precessing the seismic data, correcting for normal move out, spherical spreading and dipping and folded reflectors.

3. The method of claim 1, wherein the step of padding with zeros comprises the step of introducing zeros to the lower boundary of the seismic section, thereby moving the point sources of the artifacts downward and out of a zone of valid seismic data.

4. The method of claim 1, wherein the step of collapsing the seismic data to their point sources of energy comprises the step of applying an algorithm, thereby causing diffraction semicircles of an artifact to collapse to its apex.

5. A method for removing boundary-generated artifacts from a seismic section generated during data processing, comprising the steps of:
   (a) padding the seismic section with zeros to move the artifacts downward, approximately doubling the size of the seismic section;
   (b) collapsing the artifacts to a point source of origin;
   (c) reducing the size of the seismic section back to its original size thereby omitting the artifacts; and
   (d) reversing step (b) to transform the seismic section back to its original form absent the artifacts.

6. The method of claim 5, wherein the step of collapsing the artifacts to a point source of origin is comprised of the step of applying a diffraction algorithm to the seismic section.

7. A post-processing method for removing noise generated by artificial boundaries in a seismic section, comprising the steps of:
   (a) enlarging the seismic section by padding with zeros to move the noise downward;
   (b) collapsing the noise to a point source of origin;
   (c) reducing the size of the seismic section to exclude the noise; and
   (d) reversing step (b) to place the seismic section in its original form absent the noise.

8. The method of claim 7, further comprising the step of substantially processing the seismic section, correcting for normal move out, spherical spreading and migration, prior to the step of enlarging the seismic section with zeros.

* * * * *